United States Patent
Ogle et al.

(10) Patent No.: US 6,191,414 B1
(45) Date of Patent: Feb. 20, 2001

(54) COMPOSITE FORM AS A COMPONENT FOR A PRESSURE TRANSDUCER

(75) Inventors: Peter C. Ogle, Charlestown, RI (US); Arthur D. Hay, Cheshire; Alan D. Kersey, South Glastonbury, both of CT (US)

(73) Assignee: CiDRA Corporation, Wallingford, CT (US)

( * ) Notice: Under 35 U.S.C. 154(b), the term of this patent shall be extended for 0 days.

(21) Appl. No.: 09/326,098

(22) Filed: Jun. 4, 1999

Related U.S. Application Data

(63) Continuation-in-part of application No. 09/090,555, filed on Jun. 5, 1998, now abandoned.

(51) Int. Cl.[7] .............................. G01B 11/16; G01L 1/24

(52) U.S. Cl. .......................... 250/227.14; 356/32; 73/800

(58) Field of Search .................... 250/227.14, 227.16, 250/227.18, 227.19; 356/32, 35.5; 73/800; 385/12, 13

(56) References Cited

U.S. PATENT DOCUMENTS

| 4,376,390 | 3/1983 | Rines . |
| 4,403,144 | 9/1983 | Strahan et al. . |
| 4,419,895 | 12/1983 | Fuller . |
| 4,429,573 | 2/1984 | Walker . |
| 4,534,222 | 8/1985 | Finch et al. . |

(List continued on next page.)

FOREIGN PATENT DOCUMENTS

19726731C1 * 4/1998 (DE) .

OTHER PUBLICATIONS

"Monitoring Structural Performance with Optical TDR Techniques," Alan D. Kersey, Sep. 17–19, 1994, pp. 432–442.

"Multiplexed fiber Bragg grating strain–sensor system with a Fabry Perot wavelength filter," Alan D. Kersey, Opt. Letters, vol. 18, No. 16, Aug. 1993.

*Primary Examiner*—John R. Lee
*Assistant Examiner*—Kevin Pyo
(74) *Attorney, Agent, or Firm*—Ware, Fressola, Van Der Sluys & Adolphson LLP

(57) ABSTRACT

A pressure transducer using as a component for changing shape in response to a change in the pressure being measured a composite elongated body, with specially arranged reinforcing fibers. Such a pressure transducer can use various means for sensing the change in shape of the elongated body, including an optical fiber affixed to the elongated body so as to itself change in length in response to a change in pressure, and having a Bragg grating as part of the optical fiber, with the Bragg grating positioned and arranged so as to convey, in response to an optical signal, information about the change in shape of the elongated body. The elongated body is provided with at least one pair of contra-helically wound reinforcing fibers, which may even be bi-axially braided, and are wound either to amplify the effect of pressure acting on the elongated body or to insulate the elongated body from the effects of pressure and other sources of stress. The reinforcing fibers are embedded in a resin, and in some applications more than one pair of contra-helically wound reinforcing fibers are used, so that the composite body consists of more than one layer of reinforcing fibers. The resulting elongated body is a non-isotropic material and can be designed to have a Poisson's ratio significantly greater than ½, the maximum possible Poisson's ratio for an isotropic material, providing an enhanced axial strain accompanying any radial or circumferential strain. The elongated body can also be designed to have a small Poisson's ratio by using an inner layer and outer layer of contra-helical windings where the reinforcing fibers of the two layers intersect at different angles.

21 Claims, 5 Drawing Sheets

U.S. PATENT DOCUMENTS

| | | |
|---|---|---|
| 4,567,771 | 2/1986 | Nelson et al. . |
| 4,595,830 | 6/1986 | McMahon . |
| 4,635,482 | 1/1987 | Walker . |
| 4,671,113 | 6/1987 | Carome . |
| 4,725,110 | 2/1988 | Glenn et al. . |
| 4,739,661 | 4/1988 | Bucholtz et al. . |
| 4,743,116 | 5/1988 | Udd et al. . |
| 4,755,051 | 7/1988 | Cahill et al. . |
| 4,761,073 | 8/1988 | Meltz et al. . |
| 4,800,267 | 1/1989 | Freal et al. . |
| 4,806,012 | 2/1989 | Meltz et al. . |
| 4,829,821 | 5/1989 | Carome . |
| 4,860,586 | 8/1989 | Miers et al. . |
| 4,876,447 | 10/1989 | Killian . |
| 4,893,930 | 1/1990 | Garrett et al. . |
| 4,900,918 | 2/1990 | Killian . |
| 4,900,919 | 2/1990 | Twerdochlib . |
| 4,930,862 | 6/1990 | Miers et al. . |
| 4,932,263 | 6/1990 | Wlodarczyk ............ 73/705 |
| 4,950,883 | 8/1990 | Glenn . |
| 4,996,419 | 2/1991 | Morey . |
| 4,996,884 * | 3/1991 | Lessing ................. 73/800 |
| 5,061,069 | 10/1991 | Califano . |
| 5,099,690 | 3/1992 | Califano . |
| 5,134,882 | 8/1992 | Taylor . |
| 5,155,548 | 10/1992 | Danver et al. . |
| 5,218,197 | 6/1993 | Carroll . |
| 5,276,322 | 1/1994 | Carome . |
| 5,308,973 | 5/1994 | Odoni et al. . |
| 5,317,929 | 6/1994 | Brown et al. . |
| 5,339,696 | 8/1994 | Carignan . |
| 5,361,130 | 11/1994 | Kersey et al. . |
| 5,363,342 | 11/1994 | Layton et al. ............ 367/149 |
| 5,369,485 | 11/1994 | Hofler et al. . |
| 5,399,854 | 3/1995 | Dunphy et al. .......... 250/227.17 |
| 5,401,956 | 3/1995 | Dunphy et al. . |
| 5,420,688 | 5/1995 | Farah . |
| 5,426,297 | 6/1995 | Dunphy et al. . |
| 5,444,803 | 8/1995 | Kim et al. . |
| 5,451,772 | 9/1995 | Narendran . |
| 5,452,087 | 9/1995 | Taylor et al. . |
| 5,493,113 | 2/1996 | Dunphy et al. . |
| 5,493,390 | 2/1996 | Varasi et al. . |
| 5,495,892 | 3/1996 | Carisella . |
| 5,507,341 | 4/1996 | Eslinger et al. . |
| 5,513,913 | 5/1996 | Ball et al. . |
| 5,529,346 | 6/1996 | Sperring . |
| 5,564,504 | 10/1996 | Carisella . |
| 5,633,960 | 5/1997 | Lagakos et al. . |
| 5,845,033 | 12/1998 | Berthold et al. .......... 385/12 |

* cited by examiner

COMPOSITE FORM AS A COMPONENT FOR A PRESSURE TRANSDUCER

CROSS-REFERENCE TO RELATED APPLICATIONS

This application is a continuation in part of application Ser. No. 09/090,555, filed Jun. 5, 1998, now abandoned.

FIELD OF THE INVENTION

The present invention pertains to the measurement of pressure, including both hydrostatic pressure and acoustic pressure, and in particular to a composite structure as a component of a pressure transducer for changing shape in response to pressure.

BACKGROUND OF THE INVENTION

As is well known in the art of pressure measurement, a pressure transducer typically consists of two general components: a component that responds mechanically to a change in pressure, i.e. by e.g. changing shape, and a component that senses the mechanical response of the other component and provides a signal that can be correlated with the mechanical response, i.e. a strain sensor.

For measuring pressure, such as pressure in a fluid, the mechanically responding component is often a cylindrical body. One way of measuring pressure is to sense how a cylindrical body will lengthen, in what is called Poisson's effect, in response to pressure imposing a radial stress on the body leading to circumferential stress, also called hoop stress. In Poisson's effect, when pressure, such as fluid pressure, squeezes radially on a cylindrical body, the body tends to lengthen as it thins, i.e. it experiences axial strain as well as circumferential strain.

The prior art also teaches that it is also useful to sense how a cylindrical body thins, instead of how it lengthens, in response to an increase in pressure acting on the cylindrical walls of the cylindrical body. Sensing either aspect of the mechanical response, either the lengthening or thinning response to an increase in pressure, can be done by the second component of a pressure transducer.

To measure axial strain of a cylindrical body exposed to some pressure, a fiber optic, having a Bragg grating, is often arranged along the length of the body and attached so as to lengthen along with the body. A Bragg grating is created over a length of a fiber optic by exposing segments along the length to different light in the ultraviolet range causing different indices of refraction. The axial strain is then detected by interferometry, i.e. when light is passed through the fiber, the Bragg grating causes an interference pattern that depends on the length over which the Bragg grating extends; when the length changes, as a result for example of fluid pressure and Poisson's effect, the pattern changes and does so in a way that allows the change in length to be determined, which can then be correlated with pressure that caused the change in length.

An alternate method of using an optical fiber Bragg grating as one component of a pressure transducer to sense how a cylindrical body, serving as the other component, strains axially in response to a change in pressure is to create a Bragg grating on either end of a length of optical fiber lengthening as a result of Poisson's effect. This method has a far greater sensitivity than the single Bragg grating approach, because a greater length of fiber is strained yielding a greater overall change in length.

When a body deforms in a way that exhibits Poisson's effect, so that strain parallel to the applied stress is accompanied by strain orthogonal to that stress (e.g. squeezing circumferentially on a cylindrical body not only makes it thinner but also makes it longer), the ratio of the orthogonal strain to the parallel strain is known as Poisson's ratio and is an indicator of the magnitude of Poisson's effect for the particular material or structure composing the body.

The use, as a temperature sensor, of an optical fiber with a Bragg grating is not new, and such use includes embedding an optical fiber sensor in a plurality of layers of resin reinforced by (non-optical) fibers. U.S. Pat. No. 5,399,854 to Dunphy et al. teaches embedding an optical fiber sensor in a plurality of layers of fiber-reinforced resin, each layer having a different thermal expansion coefficient, and the reinforcing fibers of each layer oriented to cause transverse stresses on the embedded optical fiber different from those caused by the other layers, the difference depending on the temperature being sensed. The unequal transverse stresses cause birefringence in the grating, which can be correlated with the temperature being sensed.

In contrast, according to the prior art, in order to make a pressure sensor sufficiently sensitive, bare (i.e. unsheathed) optical fiber is often used, so that the optical fiber having a Bragg grating is exposed to the full pressure, undiminished by any sheathing. But bare optical fibers are susceptible to abrasion and chemical attack, so that in some applications, using ensheathed optical fibers is not practical.

Sometimes in the prior art, bare optical fibers are sheathed in a fine diameter steel capillary tube filled with fluid to protect against chemical attack and abrasion. However, such a sheathing reduces the sensitivity of the optical fiber. Furthermore, steel tubing has a different coefficient of thermal expansion than optical fiber material, and this difference creates thermal-based axial strains that compound the pressure measurement. If one could assume that the optical fiber would expand with the steel capillary, one could subtract out the effect of the thermal strains. However, the optical fiber can slip within the metal capillary, so the thermally induced strains are difficult to predict and thus distinguish from pressure induced strain.

In other prior art, an optical fiber is made more sensitive to pressure by encapsulating or jacketing the optical fiber in a soft polymer having a relatively low bulk modulus of elasticity and a relatively high Young's modulus, and using a jacket outer diameter as large as 2000 microns on an optical fiber with a diameter of 125 microns. A disadvantage of these polymer coatings is their very high sensitivity to temperature changes due to the very large coefficient of thermal expansion of these polymers. Changes in temperature cause very large expansions of the polymer coatings; these expansions strain the optical fiber and the Bragg grating giving a false indication of a pressure change, and sometimes damaging the optical fiber.

Even the bare optical fiber itself will respond to temperature changes by undergoing thermal expansion or contraction in both length and diameter, but these changes in dimension can be compensated for by using a second grating that is not exposed to the pressure. However, with a bare optical fiber, even a flowing of fluid over the optical fiber can, through shear stresses, impart axial stresses that interfere in the pressure measurement.

What is needed is a mechanical form, for use as the mechanical component of a pressure transducer, that will not itself experience significant thermal strains, but will exhibit a pronounced Poisson's effect when exposed to a change in pressure acting on the mechanical form, and so exhibit significant axial and longitudinal strains. When used with an optical fiber having a Bragg grating as the second component of a pressure transducer, the mechanical form should not reduce the sensitivity of the optical fiber to the pressure being measured, even if it ensheathes the optical fiber and so protects the optical fiber against abrasion and chemical attack.

In some applications, a cylindrical body used as the mechanical component of a pressure sensor can extend over a distance spanning regions where sensitivity to pressure is not wanted, and other regions where it is. Because of this, an even more advantageous mechanical form would allow varying sensitivity to pressure along its length, so that it is more sensitive to pressure along some spans, and substantially insensitive along other spans.

Another important advantage would be for the mechanical form to be producible in a continuous batch process, so that there would be no break between lengths of the form intended to exhibit different sensitivities to pressure. In other words, ideally, the manufacturing process would produce, as the mechanical form, a continuous material, although differing in its construction in different spans, according to the level of response to pressure wanted by the different spans.

SUMMARY OF THE INVENTION

In order to provide the above features, the present invention provides, as the mechanical component of a pressure transducer, a mechanical form that is an elongated body including a layer of contra-helically-wound reinforcing fibers, which may be bi-axially braided, arranged along the elongated body, the mechanical form for providing a change in shape in response to a change in pressure. Such a mechanical form is also referred to as a composite form, because it is made from both resin material as well as reinforcing fibers, which are a different material from the resin. A pressure transducer based on a mechanical form according to the present invention would also include a means of sensing the change in shape of the mechanical form and providing a signal based on the change in shape, i.e. a strain sensor.

In one aspect of the invention, the means of sensing the change in shape (strain sensor) is based on an optical fiber affixed to the elongated body so as to change in length in proportion to the change in shape of at least a portion of the elongated body, where the optical fiber has a Bragg grating as part of the optical fiber. Such an optical fiber is disposed either lengthwise along the elongated body, or is spirally wrapped over at least one layer of the elongated body.

The reinforcing fibers are embedded in a resin system, usually based on an elastomeric material having a low to moderate Young's modulus. In some embodiments, there is a second layer of contra-helically-wound reinforcing fibers, which may be bi-axially braided. In such embodiments, along spans of the elongated body intended to be sensitive to pressure, the two layers of reinforcing fibers are arranged so as to have a similar scissor action in response to pressure; along spans where the elongated body is intended to be insensitive, the two layers are arranged to have different scissor actions, a situation in which a change in length of the elongated body is inhibited.

To counter thermal stress from interfering with a pressure measurement by a pressure transducer using an optical fiber and a mechanical form according to the present invention, the mechanical form uses an elastomeric material, for its resin, having a coefficient of thermal expansion substantially similar to the coefficient of thermal expansion for the optical fiber.

BRIEF DESCRIPTION OF THE DRAWINGS

The above and other objects, features and advantages of the invention will become apparent from a consideration of the subsequent detailed description presented in connection with accompanying drawings, in which:

FIG. 5b is a perspective view of the fiber-optic pressure transducer of FIG. 5a;

FIG. 6b is a perspective view of the fiber-optic pressure transducer of FIG. 6a.

DESCRIPTION OF THE PREFERRED EMBODIMENT

Figure 1:
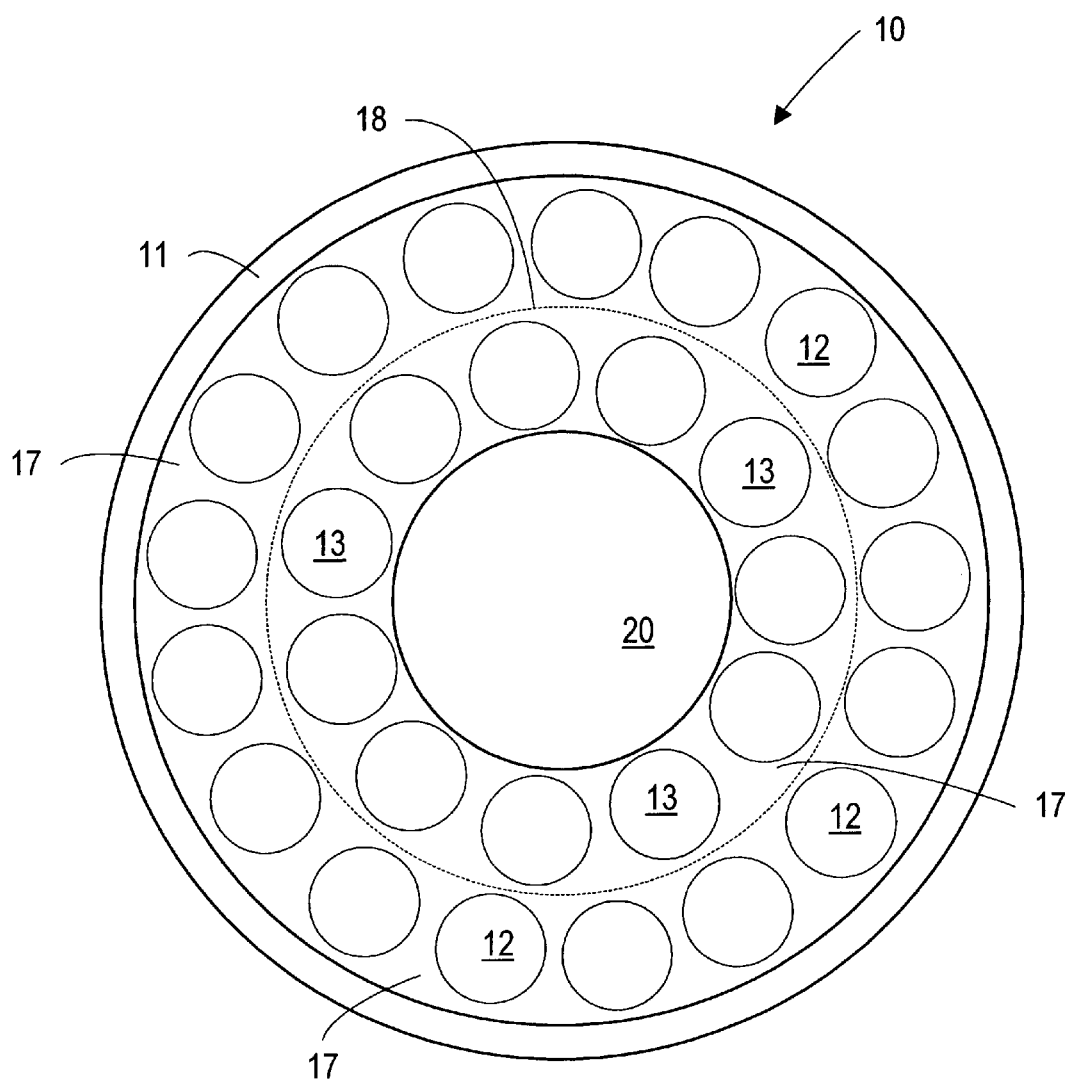
FIG. 1 is a schematic cross-sectional view of a mechanical form, according to the present invention for use as a component of a pressure transducer, in an embodiment having two layers of contra-helically wound, bi-axially braided reinforcing fibers.

Referring now to FIG. 1, a mechanical form 10, according to the preferred embodiment, for use as a component of a pressure transducer, is shown having an outer annular layer of contra-helically wound and braided reinforcing fibers 12 on top of another, inner annular layer of contra-helically wound and braided reinforcing fibers 13, with both layers encapsulated by a resin 17 filling interstitial spaces between a core region 20 and a form covering 11, and also wetting the fibers 12 and 13 of the two layers. The two layers are distinguished by the dashed line 18. The resin 17 is a polymer having a low to moderate Young's modulus of elasticity, i.e. from approximately 0.5–50.0 ksi. Depending on how the reinforcing fibers 12 and 13 are arranged, the mechanical form 10 deforms more or less in response to pressure acting on it, as explained below; along some spans of the mechanical form, the reinforcing fibers are arranged so that the mechanical form is substantially insensitive to changes in pressure acting on it, and along other spans, the reinforcing fibers are arranged so that the mechanical form is especially sensitive to changes in pressure, i.e. it is made to deform in a particular way, for example by lengthening, more than an isotropic material would deform in that particular way, as explained below.

Figure 5A:
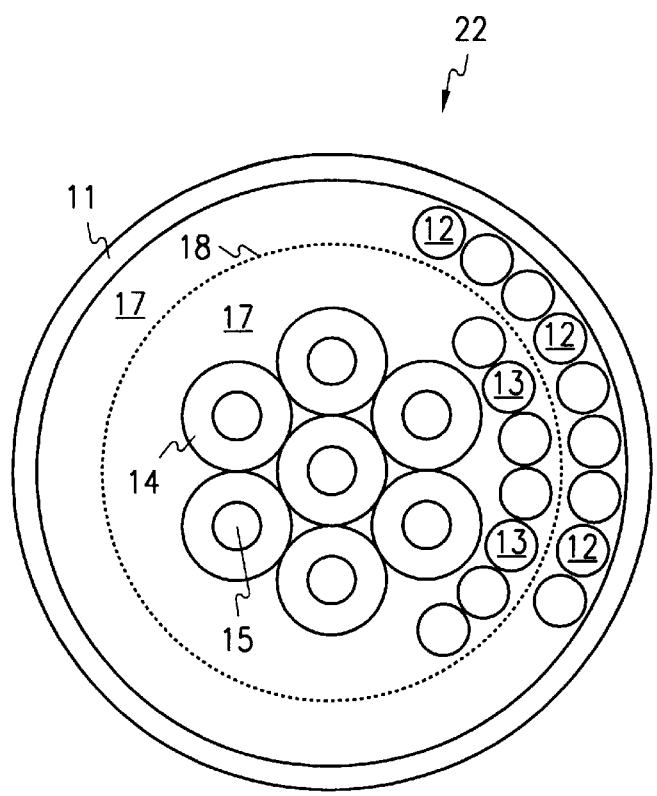
FIG. 5a is a cross-sectional view of a fiber-optic pressure transducer, with multiple optical fibers ensheathed by the mechanical form of the present invention.
Figure 5B:
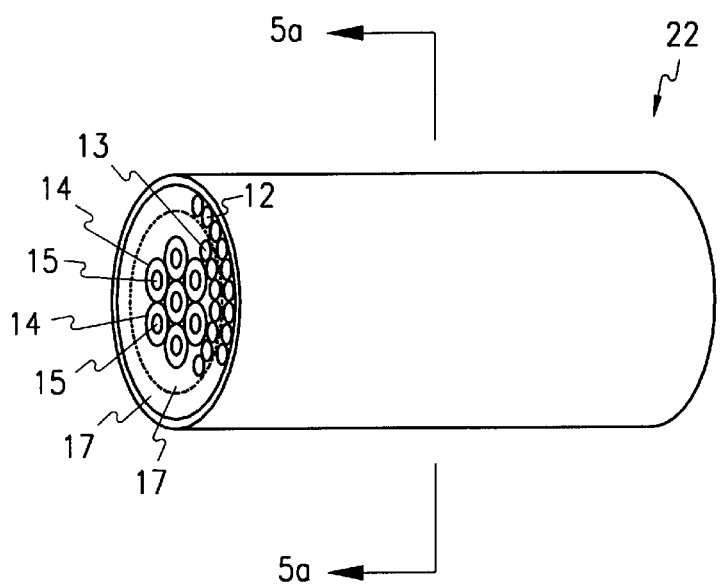

In some embodiment, as shown in FIGS. 5a and 5b, a pressure transducer based on the mechanical form 10 includes in the core region 20, as the component that senses the change in shape of the mechanical form 10, i.e. the strain sensor component, at least one optical fiber 15 having a fiber buffer coating 14 and having at least one Bragg grating. In such an embodiment, in a span of the mechanical form that is made sensitive to pressure, as the pressure increases, the mechanical form will, preferably, lengthen, and the optical fibers within the core region 20 will stretch correspondingly, since they are coupled to the mechanical form as explained below. Then, when a light signal is passed down the optical fibers so stretched, its reflection from the Bragg grating ingrained in the optical fiber conveys the strain of the optical fiber, which is correlated to the strain of the mechanical form, which is correlated with the pressure being measured.

In other embodiments, as described below, the component for sensing the change in shape of the mechanical form 10, of which an optical fiber having a Bragg grating is just an example, is not necessarily located in the core region 20. In those embodiments, the core region 20 is advantageously filled with a silicon gel, or some other compliant material. In other embodiments, a thin-walled, compliant, air-backed cylinder may be located in the core region.

Figure 2:
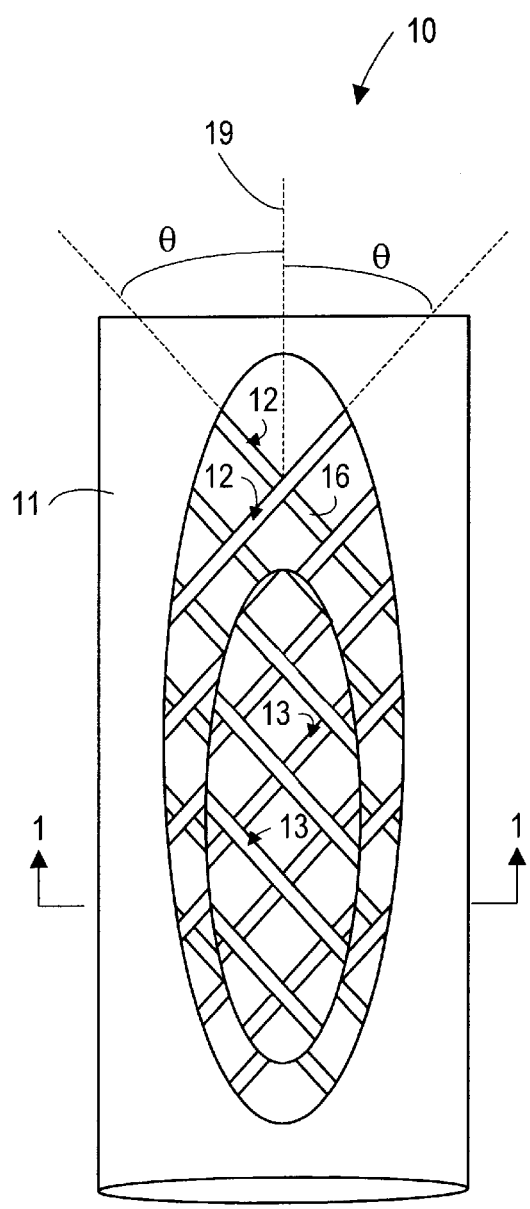
FIG. 2 is cut-away view of a span of the mechanical form of FIG. 1, showing an inner and outer layer of contra-helically wound, but not braided, reinforcing fibers with the same polar angle for each.

Referring now to FIG. 2, a mechanical form 10 is shown in the region where it is intended to be sensitive to fluid pressure. In this embodiment, the mechanical form 10 again includes two layers of contra-helically wound reinforcing fibers 12 and 13, but the reinforcing fibers 12 and 13 are not braided. The cutaway view shows the inner layer and outer layer. The reinforcing fibers 12 of the outer layer are arranged to have two different axes, i.e. to lie along two different directions. The reinforcing fibers in one direction make an angle 2θ relative to the reinforcing fibers in the other direction, or an angle θ with respect to the bisector 19 of the total angle 2θ between any two non-parallel reinforcing fibers. The angle θ of a layer is here called the polar angle of that layer. In the case of a layer that is braided (and so still contra-helically wound), there is also a polar angle according to the same description. Preferably, the mechanical form is constructed out of layers of reinforcing fibers with polar angles ranging from approximately 5° to 85°.

Figure 4:
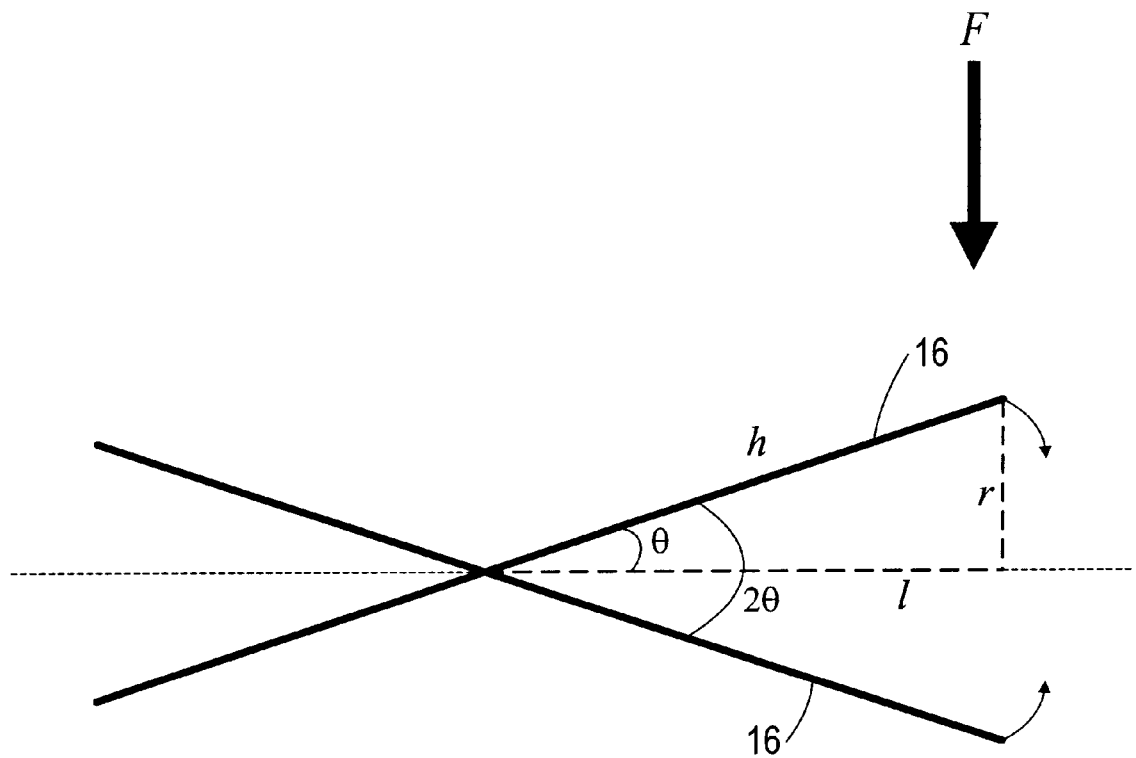
FIG. 4 is a diagrammatic representation of scissoring, under the influence of pressure and resulting circumferential strain, by spans of two reinforcing fibers, one from each of two contra-helically wound reinforcing fibers of one layer.

When the reinforcing fibers 12 of the outer layer are wound to have the same polar angle as the reinforcing fibers 13 of the inner layer, the two layers will tend to scissor at a single rate, under the influence of a circumferential stress, and so elongate the encapsulated optical fibers. Referring now to FIG. 4, this scissoring of reinforcing fibers 16 amplifies Poisson's effect; as a layer is squeezed to a smaller radius, it elongates axially. To arrange for highest sensitivity, the polar angle θ for both the first and second layer should be close to 30°. If the two layers are wound to have different polar angles, however, there will be little response to pressure acting on the mechanical form. As described below, since the rate of elongation depends on the polar angle, when the two layers are wound with significantly different polar angles, preferably polar angles that differ by as much as 30°, the two layers will tend to elongate at significantly different rates, but because the two layers are coupled through the resin 17 (see FIG. 1), elongation of the two layers at different rates is made difficult, so the mechanical form tends not to elongate at all.

Without the reinforcing fibers arranged as described to either amplify or reduce Poisson's effect, the mechanical form is essentially an isotropic material and can have at best, for purposes of sensing pressure, a Poisson's ratio of approximately 0.20. An optimum polymer material for a mechanical form will at best have a Poisson's ratio of 0.50; thus the actual strain can only be one-half the radial or circumferential strain. The contra-helically wound mechanical form of the present invention is non-isotropic and it is possible for it to have a Poisson's ratio of greater than one-half, and in fact as much as one or two.

In other words, it is possible to provide a mechanical form that will experience up to twice as much axial as radial or circumferential strain as a result of pressure. The axial strain can then be more readily detected by, for example, interferometry using one or more Bragg gratings in an optical fiber to correlate changes in interference patterns with a change in length of the optical fiber affixed to the mechanical form to follow a change in shape of the mechanical form.

Figure 3:
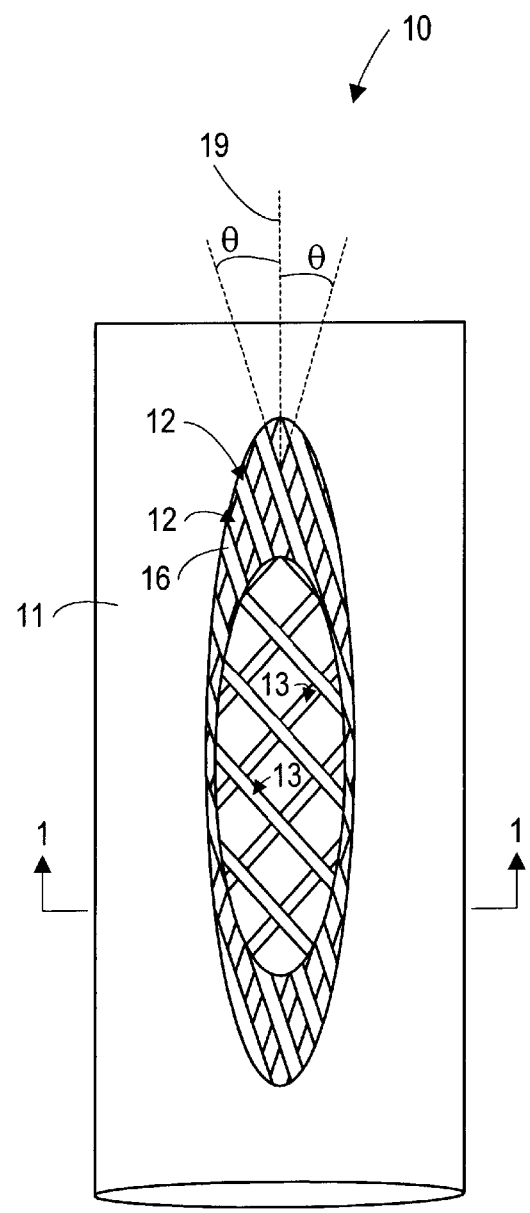
FIG. 3 is a cut-away view of a span of the mechanical form of FIG. 1, showing an inner and outer layer of contra-helically wound, not braided, reinforcing fibers with different polar angles.

Referring now to FIG. 3, a span of a mechanical form 10 intended to be insensitive to fluid pressure has an outer layer of contra-helically wound reinforcing fibers 12 and an inner layer of contra-helically wound reinforcing fibers 13, where the two layers have different polar angles. Preferably, in such a pressure insensitive span of the mechanical form, the polar angles of the two layers both differ from the single polar angle in a sensitive span, but by opposite amounts. In other words, if where the mechanical form intended to be sensitive has a polar angle of 30° for both the inner and outer layers, then in the region where the optical fiber is intended to be insensitive, the outer layer is preferably wound with a polar angle of 30°+10°=40°, and the inner layer is preferably wound with a polar angle of 30°−10°=20°.

The basis for the control of Poisson's ratio for the mechanical form is that the polar angle controls the rate of axial strain per unit circumferential strain, because the reinforcing fibers in the contra-helical winding stretch very little themselves, and the elongation of the mechanical form results purely from scissoring of the contra-helical windings. The rate at which a contra-helical winding scissors depends on the polar angle, a larger polar angle providing a larger rate of elongation per change in polar angle. FIG. 4 shows two reinforcing fibers 16 of a contra-helical winding closing under the influence of a radial stress F. As the contra-helical winding scissors, the polar angle q decreases, and it is easy to show that the rate of change of the length l of the reinforcing fiber with change in q is given by $$dl/d\theta = -h \cdot \sin(\theta),$$

where h is the hypotenuse formed by the reinforcing fiber used in a contra-helical winding; the reinforcing fiber itself not appreciably deforming (lengthening) in this scissoring. This result shows that in the case of inner and outer layers having different polar angles, the scissoring will be at different rates, and therefore each of the two layers will tend to resist scissoring by the other.

Using a polymer for the resin 17 (see FIG. 1) can create problems stemming from thermal expansion. Most polymers used for a resin system have an inherently high and undesirable coefficient of thermal expansion (CTE). Thermal expansion of the resin can be controlled somewhat by using polar angles in some particular ranges. A polar angle of 20° will provide, even for the overall structure of a pressure transducer using optical fibers, near-zero thermal expansion in the axial (lengthwise) direction of the mechanical form, while a polar angle of 30° will provide, overall for the same kind of pressure transducer, a large negative CTE for expansion in the axial (lengthwise) direction of the mechanical form. The potentially different thermal and mechanical properties of all the materials of the pressure transducer must be considered in arranging for a desired strain response.

Referring now to FIGS. 5a and 5b, in one application a pressure transducer 22 based on a mechanical form 10 according to the present invention has a bundle of optical fibers 15 each having a fiber coating 14, all ensheathed by a low to moderate Young's modulus resin 17 reinforced by two layers of contra-helically wound reinforcing fibers 12 and 13 (see FIGS. 2 and 3) all surrounded by a form covering 11. The outer-lying of the reinforcing fibers 12 are placed in intimate contact with the inner lying reinforcing fibers 13 through their coatings 14 of the optical fibers 15. The reinforcing (non-optical) fibers 12 and 13 can be, for example, E-glass fibers. In the preferred embodiment, the reinforcing fibers occupy approximately 50% of the volume between the buffer coatings 14 and the form covering 11; the rest is filled with resin 17. Such a pressure transducer is useful for measuring pressure at different places using a single mechanical form, responding to pressure differently along different spans by virtue of how its reinforcing fibers 12 and 13 are arranged, as described above. The ensheathed optical fibers would each have one or more Bragg gratings arranged to provide information about the response of the mechanical form 10 at different spans along the mechanical form. For example, in case of two ensheathed optical fibers, each might have a pair of Bragg gratings bracketing a span of the mechanical form located in a region where the pressure is to be measured, or might have a single Bragg grating extending over such a span. Alternatively, in a multiplexing application, a single optical fiber has a series of Bragg gratings to convey information, by reflecting and altering a portion of an optical signal, about the pressure response of the mechanical form at various spans along the mechanical form.

Figure 6A:
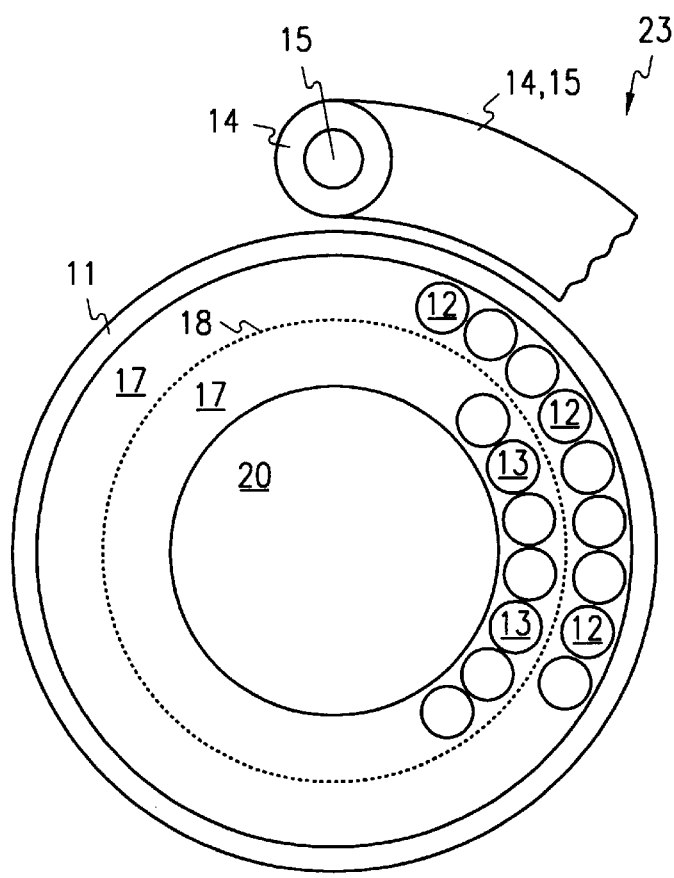
FIG. 6a is a cross-sectional view of a fiber-optic pressure transducer with an optical fiber wrapped around the mechanical form of the present invention.
Figure 6B:
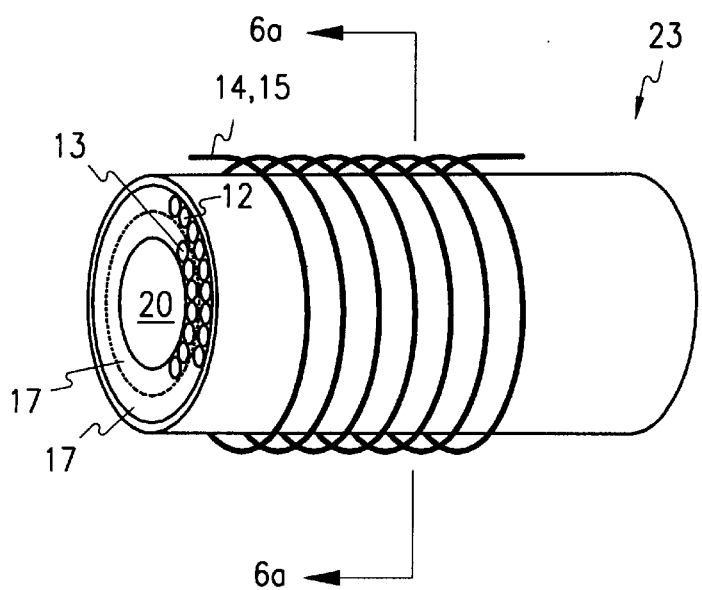

Referring now to FIGS. 6a and 6b, in another application a pressure transducer 23 based on a mechanical form 10 according to the present invention has an optical fiber 15, having a fiber coating 14, overwrapping the mechanical form 10, where the mechanical form 10 is again constructed from a low to moderate Young's modulus resin 17 reinforced by two layers of contra-helically wound reinforcing fibers 12 and 13 (see FIGS. 2 and 3), and has a form covering 11, but does not ensheathe optical fibers and instead has a core region 20; the core region should be any material or construction that will not inhibit the desired response of the mechanical form 10. Thus, for example, along a span where the mechanical form is intended to be sensitive to pressure, the core region might be even simply a void (air-filled), or may be a silicone gel, which would comply with any tendency of the mechanical form to elongate. Even in areas where the mechanical form is intended to be insensitive to pressure, the core region can be simply a void or filled with a silicone gel, but if the pressure to be resisted is high, the core region is advantageously filled with a material that tends not to strain circumferentially. In this application, the reinforcing fibers occupy approximately 50% of the volume between the core region and the form covering 11; the rest is filled with resin 17. The optical fiber in this application preferably includes a series of Bragg gratings to provide, in a multiplexed signal, information about the pressure response of the mechanical form 10 at a series of span locations along the mechanical form.

In constructing a pressure transducer based on a mechanical form according to the present invention, and using ensheathed optical fibers each having a Bragg grating as a means for sensing a change in shape of the mechanical form (see again FIGS. 5a and 5b), first the coating 14 is checked to ensure it is approximately 400 microns deep, and if it is less, some additional coating material, usually silicone, is added to build up the coating 14 on each optical fiber 15, until the total thickness of the coating amounts to approximately 400 microns. Then the first and second layers of reinforcing fibers are arranged over the buffer coatings 14, and in the preferred embodiment, these layers are both bi-axially braided, with the outer layer immediately on top of the inner layer. Next, the assembly is shrink-wrapped in a skin of some suitable material, and the resin 17 is caused to impregnate, under vacuum and pressure, the space between the buffer coatings 14 and the form covering 11. The resin moves between the reinforcing fibers because of the applied pressure, and penetrates or wets the reinforcing fibers as a combined result of the applied pressure and capillary forces. Finally, the shrink-wrap is removed. The resin can also be caused to impregnate the space between the buffer coatings 14 and the form covering 11 by other means, such as, for example, pultrusion.

In applications where a pressure transducer is exposed to high temperatures, the form covering 11 is advantageously a high temperature polymer, such as the high temperature polymers disclosed in co-pending U.S. patent application entitled, "Mandrel-Wound Fiber Optic Pressure Sensor," (WFVA/CiDRA attorney docket no. 712-2.40/CC-0067) filed on the same date as this application and hereby incorporated by reference. Thus, for example, it is preferably a polytetrafluoroethylene (PTFE), commercially available for example as TEFLON® from E.I. DuPont deNemours & Company.

In applications where a pressure transducer based on a mechanical form according to the present invention has an optical fiber overwrapping at least a portion of the form, as in FIGS. 6a and 6b, an additional buffer coating (not shown) is advantageously provided. Such a buffer coating is based on the same high temperature polymers as the form covering 11. In such an application, the form covering 11 can be eliminated.

A person skilled in the art would appreciate how the optic fiber Bragg grating sensors are used as sensor elements. Gratings such as those described in U.S. Pat. No. 4,725,110, entitled "Method for Impressing Gratings Within Fiber Optics", to Glenn et al may be used in the present invention. See also U.S. Pat. No. 4,950,883 to Glenn for a "Fiber Optic Sensor Arrangement Having Reflective Gratings Responsive to Particular Wavelengths."0 However, any wavelength tunable grating or reflective element embedded in an optical fiber may be used if desired.

As described therein, a data acquisition unit has a broadband light source or laser diode with suitable photo optic couplers. Demodulators and filtering equipment can be used to monitor the shift in the wavelength of light reflected by a Bragg grating caused by strain undergone by the Bragg grating. When a Bragg grating is illuminated, it reflects a narrow band of light at a specified wavelength. A measurand, such as strain induced by pressure or temperature, will cause a change in the Bragg grating spacing, shifting the wavelength of the light it reflects. The value of the measurand is directly related to the shift in the wavelength of the light reflected by the Bragg grating. If more than one Bragg grating is used, wave division multiplexing techniques can be used to sense the shifts in wavelength of the light reflected from each individual Bragg grating. A readout device can be positioned so that a continuous reading of strain can be provided.

As is well known in the art, there are various optical signal analysis approaches that may be utilized to analyze return signals from Bragg gratings, such as are disclosed in U.S. Pat. Nos. 4,996,419; 5,361,130; 5,401,956; 5,426,297; and/or 5,493,390, all of which are hereby incorporated by reference. These approaches may be generally categorized as follows:

a) direct spectroscopy utilizing conventional dispersive elements, such as line gratings or prisms, and a linear array of photodetector elements;

b) passive optical filtering with a device having a wavelength-dependent transfer function;

c) tracking using a tuneable filter such as, for example, a scanning Fabry-Perot filter, an acousto-optic filter such as the filter described in the above referenced U.S. Pat. No. 5,493,390, or fiber Bragg grating based filters; and d) interferometric detection.

The particular technique used will depend on the Bragg wavelength shift, which in turn depends on the sensor design, and will also depend on the frequency range of the measurand to be detected. The scope of the invention is not intended to be limited to any particular optical signal analysis approach.

Alternatively, a portion or all of an optical fiber between a pair of gratings (and at the gratings, if desired) may be doped with a rare earth dopant (such as erbium) to create a tunable fiber laser, such as is described in U.S. Pat. No. 5,317,576, "Continuously Tunable Single Mode Rare-Earth Doped Laser Arrangement", to Ball et al or U.S. Pat. No. 5,513,913, "Active Multipoint Fiber Laser Sensor", to Ball et al, or U.S. Pat. No. 5,564,832, "Birefringent Active Fiber Laser Sensor", to Ball et al, which are incorporated herein by reference.

In applications involving a series of pressure transducers disposed along a single optical fiber, the various strain sensors, each serving as a component of a different pressure transducer in the series of pressure transducers, may be multiplexed along the single optical fiber using wavelength division multiplexing (WDM), time division multiplexing (TDM), or other multiplexing techniques.

The strain sensors may be configured using any type of optical grating-based measurement technique, e.g., scanning interferometric, scanning Fabry-Perot, acousto-optic tuned filter, optical filter, time of flight, etc. having sufficient sensitivity to measure the changes in the circumference of the pipe, such as that described in one or more of the following references: A. Kersey et al., "Multiplexed fiber Bragg grating strain-sensor system with a Fabry-Perot wavelength filter", Opt. Letters, Vol 18, No. 16, August 1993, U.S. Pat. No. 5,493,390, issued Feb. 20, 1996 to Mauro Verasi, et al., U.S. Pat. No. 5,317,576, issued May 31, 1994, to Ball et al., U.S. Pat. No. 5,564,832, issued Oct. 15, 1996 to Ball et al., U.S. Pat. No. 5,513,913, issued May 7, 1996, to Ball et al., U.S. Pat. No. 5,426,297, issued Jun. 20, 1995, to Dunphy et al., U.S. Pat. No. 5,401,956, issued Mar. 28, 1995 to Dunphy et al., U.S. Pat. No. 4,950,883, issued Aug. 21, 1990 to Glenn, U.S. Pat. No. 4,996,419, issued Feb. 26, 1991 to Morey, all which are hereby incorporated herein by reference in their entirety.

In case of wrapping a mechanical form according to the present invention with an optical fiber without using Bragg gratings, known interferometric techniques may be used to determine the length or change in length of the optical fiber around the mechanical form due to pressure, such as Mach Zehnder or Michaelson Interferometric techniques, as described in U.S. Pat. No. 5,218,197, entitled "Method and Apparatus for the Non-Invasive Measurement of Pressure Inside Pipes Using a Fiber Optic Interferometer Sensor" to Carroll. Interferometric sensors may be multiplexed as described in Dandridge, et al, "Fiber Optic Sensors for Navy Applications", IEEE, February 1991, or Dandridge, et al, "Multiplexed Interferometric Fiber Sensor Arrays", SPIE, Vol. 1586, 1991, pp176–183. Other techniques to determine the change in fiber length may be used.

It is also possible to wrap an optical fiber around only a portion of the mechanical form in order to sense a change in circumference of the mechanical form because of a change in pressure, provided the length of optical fiber is long enough to optically detect changes to the circumference.

Also, when a single grating is used per pressure transducer, the grating would be attached to the mechanical form, and the reflection wavelength of the grating would shift with changes in circumference of the mechanical form. When a pair of gratings is used per sensor, known Fabry-Perot, interferometric, time of flight or fiber laser sensing techniques may be used to measure the fiber length or change in fiber length due to a change in circumference, in a manner such as that described in the aforementioned references.

As has been described above, a pressure transducer according to the present invention can use any kind of strain sensor in combination with the here disclosed mechanical form. For example, besides a strain sensor based on optical signal processing as the other component of a pressure transducer, a piezoelectric strain sensor could be used to sense the change in shape of the mechanical form. Such a strain sensor could then be arranged to provide either an electrical or optical signal, and such signals could be multiplexed in various ways known in the art, to allow for a series of pressure transducers arranged over a single optical fiber. Also, the present invention could be used in any application, including a harsh environment such as an oil or gas well.

It is to be understood that the above-described arrangements are only illustrative of the application of the principles of the present invention. In particular, it is obvious that a single layer of contra-helically wound reinforcing fibers could be used in place of a two-layer sheath; then the polar angle could be made larger for greater pressure sensitivity, and smaller for less sensitivity. In addition, it is possible to practice the present invention using braid structures that are other than bi-axial. All that is necessary is to employ, over a span of the pressure transducer intended to be sensitive to pressure, a form of braid structure or winding, reinforcing the resin system, that imparts to the composite sheath a low to moderate Young's modulus in the hoop direction. The choice of resin in which to encase the reinforcing fibers is not critical, other than it have a relatively low coefficient of thermal expansion. Numerous other modifications and alternative arrangements may be devised by those skilled in the art without departing from the spirit and scope of the present invention, and the appended claims are intended to cover such modifications and arrangements.

What is claimed is:

1. A pressure transducer, comprising:
   a) an elongated body including a layer of contra-helically wound reinforcing fibers, the reinforcing fibers embedded in a resin so as to amplify a change in shape of the elongated body in response to a change in ambient pressure; and
   b) means for sensing the change in shape of the elongated body and means for providing a signal based on the change in shape.

2. A pressure transducer as claimed in claim 1, wherein the means for sensing the change in shape of the elongated body comprises an optical fiber affixed to the elongated body so as to change in length in proportion to the change in shape of at least a portion of the elongated body, wherein the optical fiber has a Bragg grating as part of the optical fiber.

3. A pressure transducer as claimed in claim 2, wherein the optical fiber is disposed lengthwise along the elongated body.

4. A pressure transducer as claimed in claim 3, wherein the optical fiber is ensheathed by the elongated body.

5. A pressure transducer as claimed in claim 2, wherein the optical fiber is spirally wrapped around at least one layer of the elongated body, for at least a portion of the span of the elongated body.

6. A pressure transducer according to claim 1, wherein the elongated body comprises elastomeric material having a low to moderate Young's modulus.

7. A pressure transducer according to claim 6, wherein the low to moderate Young's modulus of the elastomeric material is in a range from 0.5 to 50.0 ksi.

8. A pressure transducer according to claim 6, wherein the elastomeric material has a coefficient of thermal expansion substantially similar to the optical fiber coefficient of thermal expansion.

9. A pressure transducer according to claim 1, wherein the contra-helically wound reinforcing fibers are intertwined to form a braid.

10. A pressure transducer according to claim 9, wherein the braid is a bi-axial braid.

11. A pressure transducer according to claim 1, wherein the means for sensing the change in shape of the elongated body comprises an optical fiber disposed lengthwise along the elongated body and coupled to the elongated body so as to change in length in proportion to the change in shape of the elongated body, wherein the optical fiber has at least one Bragg grating as part of the optical fiber, and wherein the at least one Bragg grating is positioned so as to sense a change in shape of the elongated body over a particular span of the elongated body.

12. A pressure transducer according to claim 1, wherein the means for sensing the change in shape of the elongated body comprises an optical fiber spirally wound about at least one layer of the elongated over a particular span of the elongated body, with the spiral winding having at least one Bragg grating disposed so as to convey information in response to a light signal about the change in shape of the particular span of the elongated body.

13. A pressure transducer according to claim 1, wherein the contra-helically wound reinforcing fibers are wound at a first polar angle ranging from 5° to 85°, thereby amplifying the mechanical response of the elongated body.

14. A pressure transducer according to claim 13, wherein the elongated body includes a second layer of contra-helically wound reinforcing fibers having a second polar angle.

15. A pressure transducer according to claim 14, wherein, for a span of the elongated body, the first polar angle is substantially the same as the second polar angle, thereby forming a span of the pressure transducer that is especially sensitive to pressure.

16. A pressure transducer according to claim 15, wherein, for a span of the elongated body, the first polar angle differs from the second polar angle, thereby forming a span of the pressure transducer that is substantially insensitive to pressure.

17. A pressure transducer according to claim 16, wherein the means for sensing the change in shape of the elongated body comprises a plurality of optical fibers disposed lengthwise along the elongated body and each coupled to the elongated body so as to change in length in proportion to the change in shape of the elongated body, wherein each optical fiber has at least one Bragg grating as part of the optical fiber, and wherein the at least one Bragg grating is positioned so as to sense a change in shape of the elongated body over a span of the elongated body where the first polar angle is substantially the same as the second polar angle.

18. A pressure transducer according to claim 16, wherein the means for sensing the change in shape of the elongated body comprises an optical fiber spirally wound about at least one layer of the elongated over a plurality of different spans of the elongated body, with each spiral winding having at least one Bragg grating disposed so as to convey information in response to a light signal about the change in shape of the span of the elongated body enclosed by the spiral winding, wherein each spiral winding is about a span of the elongated body where the first polar angle is substantially the same as the second polar angle.

19. A pressure transducer according to claim 1, wherein the means for sensing the change in shape of the elongated body comprises an optical fiber disposed along a span of the elongated body.

20. A pressure transducer according to claim 19, wherein the optical fiber includes a fiber laser.

21. A pressure transducer according to claim 1, wherein the means for sensing the change in shape of the elongated body comprises a piezoelectric strain sensor.

* * * * *

UNITED STATES PATENT AND TRADEMARK OFFICE
CERTIFICATE OF CORRECTION

PATENT NO.    : 6,191,414 B1
DATED         : February 20, 2001
INVENTOR(S)   : Ogle et al.

Page 1 of 1

It is certified that error appears in the above-identified patent and that said Letters Patent is hereby corrected as shown below:

Column 8,
Line 37, please delete "0" after "Wavelengths".

Signed and Sealed this

Sixth Day of November, 2001

Attest:

NICHOLAS P. GODICI
Attesting Officer   Acting Director of the United States Patent and Trademark Office